(12) United States Patent
Fries

(10) Patent No.: US 6,799,758 B2
(45) Date of Patent: Oct. 5, 2004

(54) CLAMPING APPARATUS WITH A CLAMPING CHUCK AND A WORK PIECE CARRIER RELEASABLY CONNECTABLE THERETO

(75) Inventor: Karl Fries, Reinach (CH)

(73) Assignee: Erowa AG, Reinach (CH)

( * ) Notice: Subject to any disclaimer, the term of this patent is extended or adjusted under 35 U.S.C. 154(b) by 0 days.

(21) Appl. No.: 10/321,121

(22) Filed: Dec. 17, 2002

(65) Prior Publication Data

US 2003/0111786 A1 Jun. 19, 2003

(30) Foreign Application Priority Data

Dec. 19, 2001 (CH) .................................... 2001 2318/01

(51) Int. Cl.[7] ................................................. B23Q 1/08
(52) U.S. Cl. ..................................................... 269/309
(58) Field of Search ................................ 269/309, 310, 269/56, 900; 29/559, 563, 464, 33 P, 271; 38/180 R; 198/345

(56) References Cited

U.S. PATENT DOCUMENTS

| | | | |
|---|---|---|---|
| 4,736,659 A | 4/1988 | Erickson |
| 5,065,991 A | 11/1991 | Schneider |
| 5,415,384 A | 5/1995 | Obrist et al. |
| 5,722,806 A | 3/1998 | Erickson et al. |
| 5,918,870 A | 7/1999 | Stark |
| 5,961,261 A | 10/1999 | Stark |
| 6,161,826 A | 12/2000 | Forrer |

FOREIGN PATENT DOCUMENTS

| | | |
|---|---|---|
| DE | 41 10 857 A | 10/1992 |
| DE | 37 13 023 A | 10/1998 |
| DE | 200 09 117 U | 8/2000 |
| EP | 1 044 760 A | 10/2000 |

Primary Examiner—Robert C. Watson
(74) Attorney, Agent, or Firm—Maginot Moore & Beck

(57) ABSTRACT

The clamping apparatus comprises a clamping chuck and a work piece carrier releasably connected thereto. The clamping chuck is provided with a central opening for receiving a clamping pin attached to the work piece carrier. The central opening of the clamping chuck has a conical inserting portion, and the clamping pin has at least one surface portion corresponding in shape to the conical inserting portion, or several surface portions for aligning the clamping pin in X- and/or Y-direction. The clamping chuck comprises a clamping mechanism for clamping the clamping pin. The top of the clamping chuck is provided with at least one surface portion serving as a Z-stop member. The clamping pin is dimensioned such that, prior to activating the clamping mechanism, a gap exists between the flat bottom surface of the work piece carrier and the surface portion of the clamping chuck serving as a Z-direction stop member. The clamping pin and/or the region around the central opening of the clamping chuck is/are adapted to be elastically deformed upon activation of the clamping mechanism to further pull in the clamping pin into the central opening and simultaneously the work piece carrier towards the surface portion serving as a Z-direction stop member until the flat bottom surface of the work piece carrier rests on the surface portion of the clamping chuck serving as a Z-direction stop member.

36 Claims, 6 Drawing Sheets

CLAMPING APPARATUS WITH A CLAMPING CHUCK AND A WORK PIECE CARRIER RELEASABLY CONNECTABLE THERETO

BACKGROUND OF THE INVENTION

The present invention refers to a clamping apparatus, comprising a clamping chuck and a work piece carrier adapted to be releasably connected to the clamping chuck, having a flat bottom surface and comprising a clamping pin protruding from the flat bottom surface. The clamping chuck comprises a central opening with a conical inserting portion for receiving the clamping pin of the work piece carrier. The clamping pin comprises at least one surface portion corresponding in shape to the shape of the conical inserting portion of the central opening for aligning the position of the clamping pin in X- and/or in Y-direction. Moreover, the clamping chuck is provided with a clamping mechanism for clampingly fixing the clamping pin of the work piece carrier in the central opening, and at least one surface portion serving as a Z-direction stop member.

Such a clamping apparatus is preferably used for clamping work piece carriers equipped with one or several work pieces to be machined in the machining area of a machine tool in a well defined and predetermined position. Usually, the clamping chuck of the apparatus is fixed in the machining area of the machine tool, while the work piece carrier, provided with a clamping pin, is releasably attached to the clamping chuck.

In order to be in a position to clamp work pieces with different dimensions, so-called palletizing systems are known which comprise a plurality of clamping chucks, usually two, four, six or eight of them. By means of these plurality of clamping chucks, a work piece carrier equipped with, depending on its size, two, four, six or eight clamping pins can be clamped. In certain cases, it may happen that the work piece carrier is equipped with an odd number of clamping pins. Since an individual clamping chuck usually comprises neither means to avoid a rotation of the clamping pin nor means for determining the angular position of the clamping pin around the Z-axis, it can be advantageous to provide one or several clamping chucks with positioning means, determining besides the X- and Y-positions also the angular position around the Z-axis, with the result that, if appropriate, also work piece carriers having but one clamping pin can be clamped to the clamping chuck in an exactly defined linear and angular position. It is understood that in such a case also the work piece carrier has to be provided with positioning means cooperating with the above mentioned positioning means of the clamping chuck.

A difficulty observed particularly in connection with large and heavy work piece carriers may be seen in the fact that a required coarse aligning of the clamping pins of the work piece carrier with the corresponding openings in the clamping chucks is pretty difficult because there is only a small clearance between the front portion of the clamping pin and the opening in the clamping chuck adapted to receive the clamping pin. Moreover, there is a danger that both the clamping pin and the opening in the clamping chuck may be damaged.

PRIOR ART

Besides clamping apparatuses in which the clamping pin is provided with a cylindrical portion for its positioning within the opening of the clamping chuck, other clamping apparatuses are known in the art in which the clamping chuck is provided with a conical centering surface area for a clearance-free aligning of the clamping pin. For example the document EP 1,044,760 discloses a clamping apparatus of this kind. In this clamping apparatus, the clamping pin is aligned by means of a conical centering surface provided at the top of the opening of the clamping chuck. The housing wall of the clamping chuck is axially resilient in the region of this conical centering surface; for this purpose, a radial cutout is provided behind the conical centering surface. Thereby, an elastically resilient area is created which enables the clamping pin to be axially moved and to be pulled in further in Z-direction after having been centered. Elastically resilient surface areas of this kind have shown to be efficient particularly in small clamping apparatuses. However, in the case of clamping apparatus adapted to receive large and heavy work piece carriers, the clamping chuck is lastingly weakened by the provision of such a cutout. Moreover, it is not possible to provide a Z-reference or a Z-direction stop member in the area around the above mentioned cutout since the clamping apparatus is too resilient in Z-direction in that area. Finally, there is a danger that the elastically resilient area is damaged upon inserting the clamping pin into the clamping chuck because the elastically resilient area cannot bear high loads neither in axial nor in radial directions.

The document DE 41 10 857 discloses an apparatus for coupling a tool holder to a working spindle of a machine tool. The working spindle is provided with an opening for receiving a shaft portion of the tool holder. The opening has an upper and a lower conical portion with an annular recess having a supporting surface located between the two conical portions. The shaft portion of the tool holder is equipped with two cone rings supported by elastic abutments. Between the two cone rings, a locking mechanism is located, comprising two radially movable locking pieces. On the top, these locking pieces are provided with wedge shaped surface areas which rest in the locked state on the supporting surface of the annular recess. By providing the elastic abutments, the cone rings are axially movable relative to the shaft portion of the tool holder and enable the shaft portion to be pulled in into the opening after the cone rings having been rested on the conical portions of the opening. The cone rings themselves are provided with slots. The shaft portion is provided with a flange portion constituting at its lower end a flat annular surface serving as a Z-direction stop member, resting on the front face of the working spindle upon clamping the shaft portion. In the opening of the working spindle, both conventional clamping pins (FIG. 5) and sectional clamping pins (FIGS. 1 and 3) can be clamped. Thus, the basic idea of the invention may be seen in the fact that work piece carriers with differently designed clamping pins can be clamped by the working spindle of the machine tool. It is understood that such a clamping apparatus is not at all suitable for attaching a work piece holder to the working spindle of a machine tool in a highly precise and repeatable manner.

U.S. Pat. No. 5,722,806 discloses a coupling system that includes a male coupling having a cylindrical distal end including a recess that includes follower surfaces, a female coupling having a cylindrical interior for receiving the distal end of the male coupling, and a pair of opposing jaw members movably mounted within the interior and including external cam surfaces for engaging the follower surfaces of the male coupling when the jaw members are radially moved apart, and a drive train for radially and forcefully moving the jaw members apart. The drive train includes a wedging ball that freely floats in recesses between the opposing jaw members, and a drive rod for axially moving the wedging ball into and out of engagement with wedge surfaces located in the interior of the jaw members. The drive rod includes a distal end having a bore for slidably receiving the wedging ball. The free-floating of the wedging ball within the drive rod bore and between the internal surfaces of the jaw members allows it to apply uniform wedging forces to the jaw members when spreading them apart into a coupling position.

U.S. Pat. No. 5,918,870 discloses a device for detachable fastening of work pieces to be machined on a processing machine having a pallet on which the work pieces are detachably fastened, and which can be connected detachably via this pallet to the processing machine, wherein the locking between the pallet and one or more quick-clamp cylinders is effected through at least one pull-in bolt which are fastened on the pallet and which engage in clamping manner in corresponding receptacles on the quick-clamp cylinder, and wherein the clamping connection is maintained through tension springs, and for unlocking a hydraulic piston can be actuated which overcomes the clamping force of the tension springs, wherein in the quick-clamp cylinder the space between the central pull-in bolt and the tension springs arranged to the side of the latter is sealed.

U.S. Pat. No. 5,415,384 discloses an apparatus for clamping a work piece comprising a base and a work piece carrier adapted to be put onto and fixed to the base. The base and the carrier comprise aligning means to align the position of the carrier relative to the base along three perpendicular coordinate axes as well as the angular position. The aligning means comprises first aligning element pairs in the form of cooperating reference surfaces at the carrier and the base, which define the position of the carrier in the Z-axis. The aligning means further comprises second and third aligning element pairs in the form of cooperating linear aligning element pairs, which define the position of the carrier in the X and Y-axes, respectively. The cooperating pairs each comprise a wedge-shaped centering member and a counterpart member with a matching centering slit. Clamping means is provided for clamping the carrier to the base in a well defined position which is defined by the aligning means. The clamping means comprises a plurality of clamping members, each including a pin member fixed to the carrier and a chuck member located in the base. The carrier comprises a flat surface which faces the base if the carrier is clamped to the base. The flat surface forms one of the reference surfaces. Each one member of the second and third pairs is directly connected to the flat surface. Each pin member is also directly connected to the flat surface.

OBJECTS OF THE INVENTION

It is an object of the invention to provide a clamping apparatus with a clamping chuck and a work piece carrier releasably connected thereto whose clamping chuck is particularly suitable for palletizing systems, whereby the individual clamping chuck shall be very robust and rigid.

It is a further object of the invention to provide a clamping apparatus with a clamping chuck and a work piece carrier releasably connected thereto in which the clamping pin is aligned in X- and/or Y-direction without any clearance.

It is a still further object of the invention to provide a clamping apparatus with a clamping chuck and a work piece carrier releasably connected thereto in which a movement of the clamping pin and, thereby, the work piece carrier in Z-direction is possible after the clamping pin has been aligned in X- and/or Y-direction, without the need to provide separate elastically resilient means.

SUMMARY OF THE INVENTION

In order to meet these and other objects, the invention provides a a clamping apparatus, comprising a clamping chuck, and a work piece carrier adapted to be releasably connected to the clamping chuck, having a flat bottom surface and comprising a clamping pin protruding from the flat bottom surface. The clamping chuck comprises a central opening with a conical inserting portion for receiving the clamping pin of the work piece carrier. The clamping pin comprises at least one surface portion corresponding in shape to the shape of the conical inserting portion of the central opening for aligning the position of the clamping pin in X- and/or in Y-direction. Moreover, the clamping chuck is provided with a clamping mechanism for clampingly fixing the clamping pin of the work piece carrier in the central opening, and at least one surface portion serving as a Z-direction stop member.

The clamping pin is dimensioned such that, prior to activating the clamping mechanism, a gap exists between the flat bottom surface of the work piece carrier and the surface portion of the clamping chuck serving as a Z-direction stop member, after the clamping pin of the work piece carrier having been inserted into the central opening of the clamping chuck with the surface portion of the clamping pin having engaged the conical inserting portion of the central opening and, thereby, having aligned the clamping pin with reference to the clamping chuck in X- and/or Y-directions. Thereby, the clamping pin and/or the region around the central opening of the clamping chuck is/are adapted to be elastically deformed upon activation of the clamping mechanism to further pull in the clamping pin into the central opening and simultaneously the work piece carrier towards the surface portion of the clamping chuck serving as a Z-direction stop member until the flat bottom surface of the work piece carrier rests on the surface portion of the clamping chuck serving as a Z-direction stop member.

Thus, the basic idea of the invention may be seen in the fact that the clamping pin is designed in such a way that it can align itself without clearance in X- and/or Y-direction upon insertion into the opening of the clamping chuck without the work piece carrier resting on the clamping chuck. In other words, during that aligning of the clamping pin, a small gap remains between the bottom surface of the work piece carrier and the top surface of the clamping chuck. This gap is removed when the clamping pin is further pulled in into the opening of the clamping chuck by means of the clamping mechanism, whereby the material elasticity of the clamping pin and/or of the region of the clamping chuck around the central opening is used for that purpose. Thereby, the work piece carrier is moved in Z-direction towards the clamping chuck until its flat bottom surface rests on the Z-direction stop member constituted by the corresponding surface areas on top of the clamping chuck. In this way, the provision of means that are elastically resilient in Z-direction can be totally avoided.

BRIEF DESCRIPTION OF THE DRAWINGS

In the following, an embodiment of the apparatus according to the invention will be further described, with reference to the accompanying drawings, in which:

FIG. 3 shows a longitudinal sectional view of the clamping chuck with the work piece carrier loosely put on;

DETAILED DESCRIPTION OF A PREFERRED EMBODIMENT

Figure 1:
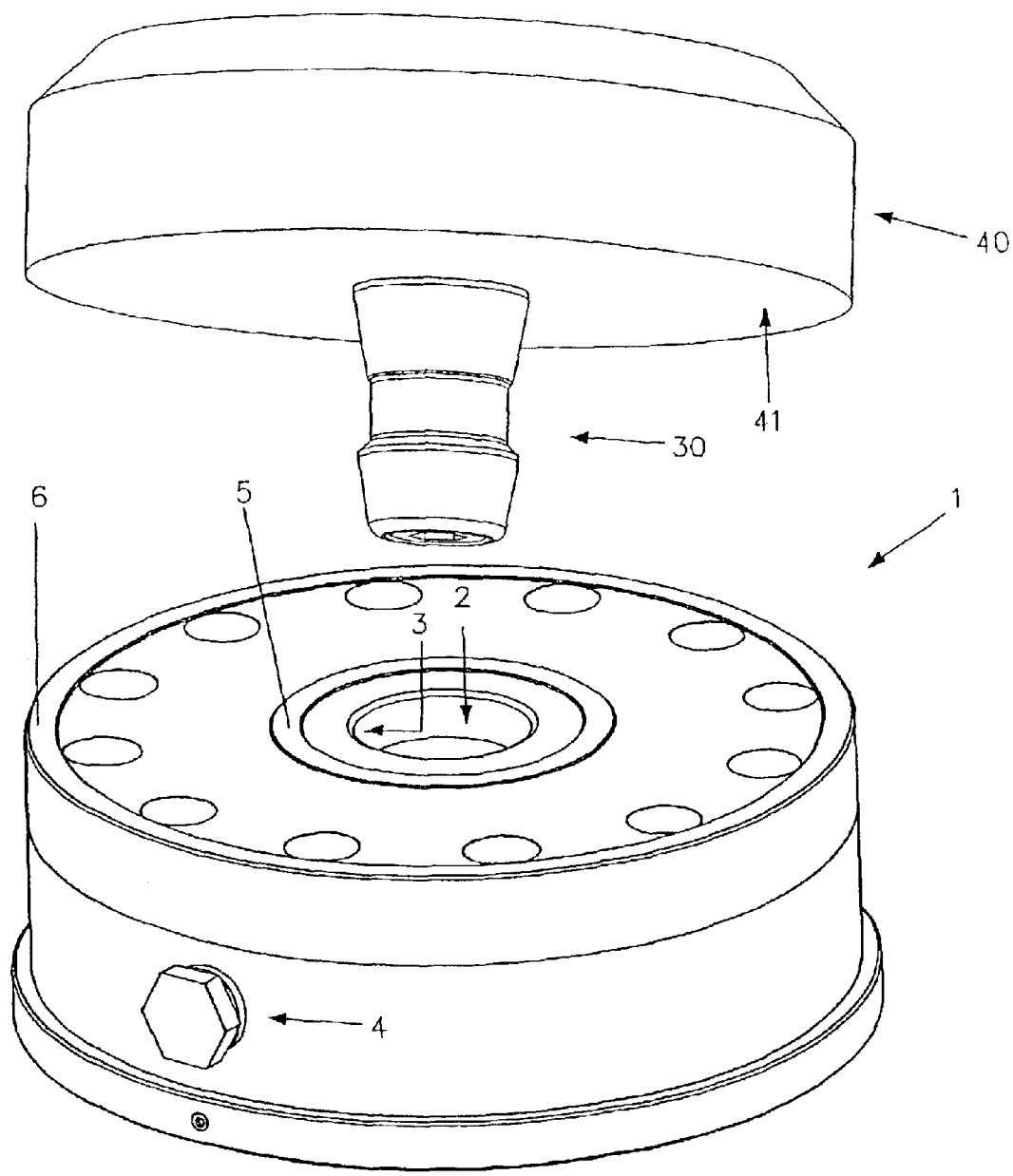
FIG. 1 shows a perspective view of a clamping chuck and of a work piece carrier.

FIG. 1 shows a perspective view of a schematically illustrated clamping apparatus. The clamping apparatus comprises a clamping chuck generally designated by reference numeral 1 and a work piece carrier generally designated by reference numeral 40. The work piece carrier 40 is provided with a clamping pin 30 by means of which the work piece carrier 40 can be fixed to the clamping chuck 1. Such a clamping apparatus is preferably and particularly used in positionally exactly defined clamping of a work piece in the working area of a machine tool (not shown). Thereby, as it is the case in the present example, the work piece carrier 40 can simultaneously be the work piece itself.

The clamping chuck 1, to be fixed to the machine tool by means known per se and not shown in the drawings, comprises a central opening 2 adapted to receive and fix the clamping pin 30 of the work piece carrier 40. The upper area of this opening 2 is designed as a conical inserting portion 3. The top surface of the clamping chuck 1 is provided with two annular surface portions 5, 6 located in concentric relationship to the central opening 2. The annular surface portions 5, 6 serve as Z-references for the work piece carrier 40, i.e. they define the height position of the work piece carrier 40 once the lower surface of the latter one rests on the surface portions 5, 6. As can be seen from FIG. 1, the inner annular surface portion 5 surrounds the opening 2 in a relatively small distance. The work piece carrier 40 comprises a flat lower surface 41 which constitutes a reference surface resting on the surface portions 5, 6 and, thereby, defining the height position, i.e. the Z-position of the work piece carrier 40 relative to the clamping chuck 1. The clamping chuck 1 is provided with a connector 4 for supplying a hydraulic or pneumatic medium to the interior of the clamping chuck 1 to lock and release, respectively, the clamping pin 30 of the work piece carrier 40, as will be explained herein below in more detail.

Figure 2:
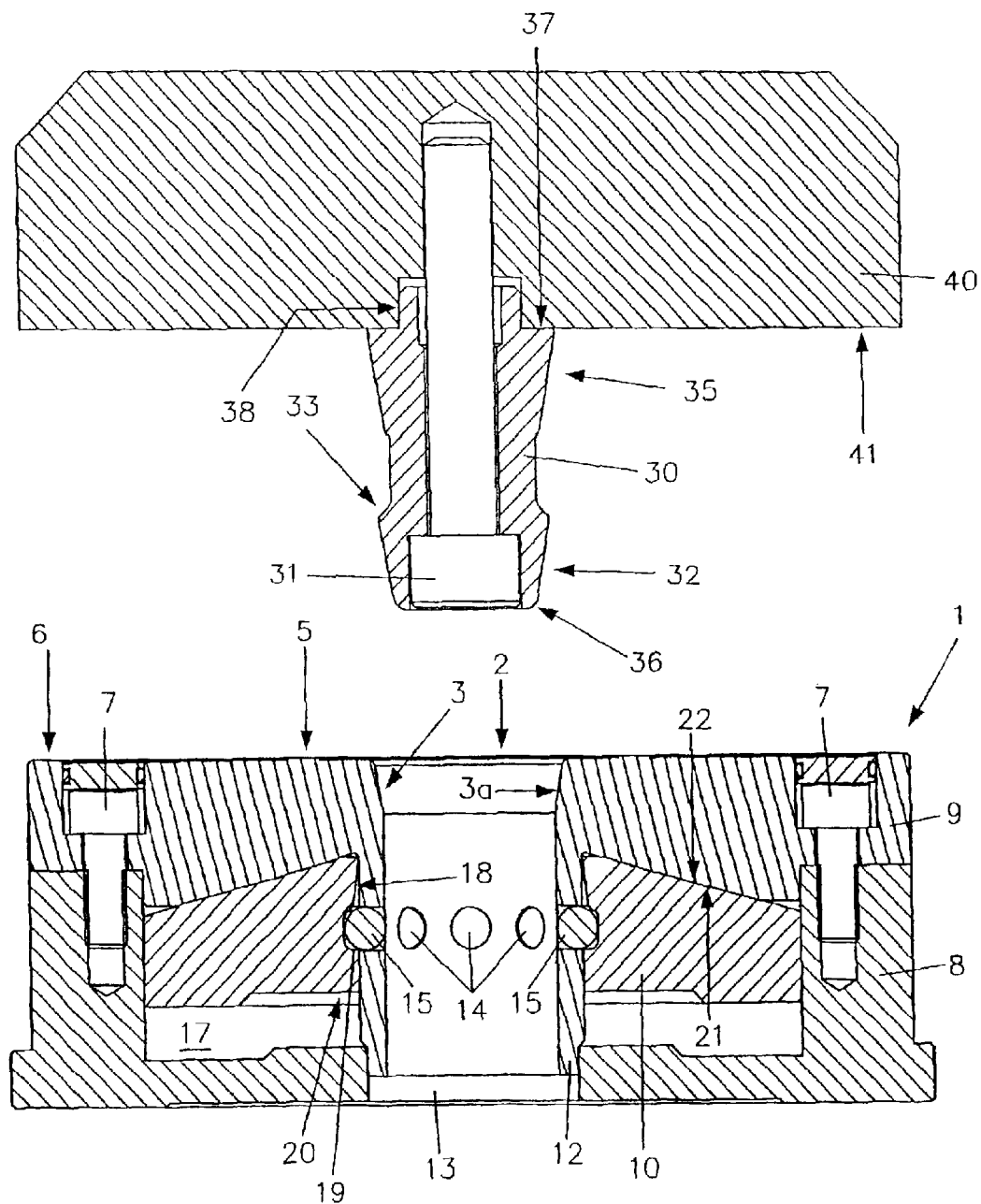
FIG. 2 shows a first longitudinal sectional view of the clamping chuck and of the work piece carrier.

FIG. 2 shows a longitudinal sectional view of the clamping chuck 1 and the work piece carrier 40. The clamping chuck 1 comprises a cup-shaped lower portion 8, an upper portion 9 connected to the lower portion 8 by means of screws 7, and a piston 10 supported by means of (not shown) biased springs on the upper portion 9. The upper portion 9 is provided with a hollow cylindrical sleeve 12 projecting downwards from the upper portion 9. The inner wall of the sleeve 12 defines the opening 2 constituted by a central continuous cylindrical bore. The sleeve 12 and the upper portion 9 are designed as a one piece construction, whereby the sleeve 12 extends downwards into a circular recess 13 machined into the lower portion 8 of the clamping chuck 1.

The upper end of the clamping pin 30 attached to the work piece carrier 40 is provided with a cylindrical reference surface portion 38 as well as with an annular reference surface portion 37. The annular reference surface portion 37 of the clamping pin 30 rests against the flat lower surface 41 of the work piece carrier; thus, the lower surface 41 of the work piece carrier, serving as a Z-reference, takes a well defined position with regard to the clamping pin 30.

A clamping mechanism 20 for clamping the clamping pin 30 comprises, besides the already mentioned piston 10 and the coil springs (not shown), a plurality of clamping balls 15. The clamping balls 15 are received in radially extending bores 14 provided in the wall of the sleeve 12. In order to enable the piston 10 to be moved, against the bias force of the (not shown) springs, into the here shown upper end position, a pressure chamber 17 is provided between the lower portion 8 of the clamping chuck 1 and the piston 10. The pressure chamber 17 can be hydraulically or pneumatically pressurized. For clarity's sake, the gaskets required to seal the pressure chamber 17 have been omitted from the drawings.

The clamping pin 30, attached to the work piece carrier 40 by means of a screw 31, comprises a truncated cone shaped portion 32 located at the front end of the clamping pin 30. The back side of the truncated cone shaped portion 32 forms a circumferential shoulder 33 on which the clamping balls 15 for pulling in and fixing the clamping pin 30 can rest. Preferably, the front edge 36 of the clamping pin 30 is rounded. In the region of its rear end, the clamping pin 30 comprises a further, truncated cone shaped portion 35. The amount of taper of both the front portion 32 and the rear portion 35 are adjusted to the amount of taper of the conical inserting portion 3 of the central opening 2. However, the front portion 32 is designed such that its minimal outer diameter is appr. 5 to 10 mm less than the greatest diameter of the conical inserting portion 3 of the central opening 2 of the clamping chuck 1. In any case, the maximal diameter of the front portion 32 of the clamping pin 30 is greater than the minimal diameter of the rear portion 35 of the clamping pin 30. The result is that the front portion 32 of the clamping pin 30 provides for a course centering of the clamping pin 30 in the central opening 2, while the rear portion 35 provides for a fine centering to exactly positionally adjust the clamping pin 30 both in X- and in Y-directions.

In order to enable the clamping balls 15 to be radially moved inwards into their operating position, the piston 10 is provided with an inclined pressure surface 18. This pressure surface 18 is designed such that the clamping balls 15 are self-lockingly held in their operating position once the piston 10 is in its locking position. Below the above mentioned pressure surface 18, the piston 10 is provided with an annular groove 19 into which the locking balls 15 can retract when the piston 10 is in its release position shown in FIGS. 2 and 3. It is understood that the clamping pin 20 can be readily inserted into and removed from the central opening 2 of the clamping chuck 1 once the piston 10 is in its release position shown here.

The upper portion 9 of the clamping chuck 1 comprises an inclined lower surface 21 and the piston comprises a correspondingly inclined upper portion 22. Together with the sleeve 12 extending up to the lower portion 8 of the clamping chuck 1, such a design results in a very rigid assembly by means of which very high pulling forces can be realized without any noticeable deformation of the upper portion 9 of the clamping chuck 1. Moreover, the one piece design of sleeve 12 and upper portion 9 of the clamping chuck 1 ensures that very high pulling forces can act on the work piece carrier 40 clamped to the clamping chuck 1, without the danger that the work piece carrier 40 moves in axial direction, because it is not resilient in Z-direction, in contrast to clamping systems using a separate clamping ball cage. Furthermore, thanks to the continuous, one-piece design of the sleeve 12, the sealing of the pressure chamber 17 is simplified.

Before the clamping pin 30 can be inserted into the central opening 2 of the clamping chuck 1, it has to be coarsely aligned to the opening 2. Thereafter, the work piece carrier can be lowered downwards onto the clamping chuck 1. Upon insertion, first, the clamping pin 30 is coarsely centered due to the fact that its front portion 32 engages the wall portion 3a of the conical inserting portion 3 of the central opening 2. Since the amount of taper of the front portion 32 is equal to the amount of taper of the inserting portion 3 of the central opening 2, and since the work piece carrier 40 is held in a horizontal position during insertion of the clamping pin 30 into the central opening 2, a line contact results between the front portion 32 of the clamping pin 30 and the wall 3a of the inserting portion 3 of the central opening 2. In the case of a line contact, the danger of damage to the clamping pin 30 and to the central opening 2, respectively, is much lower than in the case of a point contact.

Figure 3:
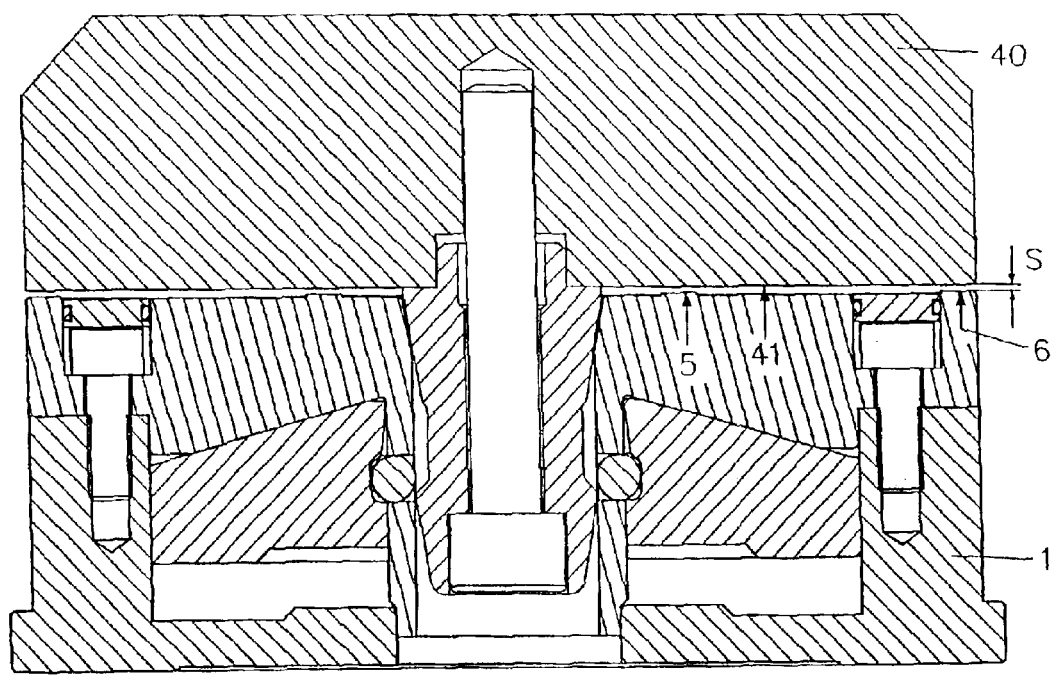

Upon continued insertion of the clamping pin 30 into the central bore 2 of the clamping chuck 1, a fine centering of the clamping pin 30 in X- and Y-directions is accomplished under the influence of the rear truncated cone shaped portion 35 of the clamping pin 1. Thereby, the rear portion 35 of the clamping pin 30 holohedrally rests on the wall 3a of the conical inserting portion 3 of the central opening 2. The dimensioning of the clamping pin 30 is chosen such that a gap S with a width of between 0.01 to 0.02 mm exists between the annular surface portions 5, 6, serving as a Z-reference, and the flat bottom surface 41 of the work piece carrier 40 after fine centering, but before clamping the work piece carrier 40 to the clamping chuck 1, i.e. when the work piece carrier 40 rests only with its inherent mass on the clamping chuck 1, as it is shown in FIG. 3. It is understood that the gap S shown in FIG. 3 is greatly exaggerated for clarity's sake.

Referred to the clamping pin 30, this means that the reference surface portion 37 of the clamping pin 30, serving as a Z-reference of the clamping pin 30, towers above the annular surface portions 5, 6 by the above mentioned amount of between 0.01 and 0.02 mm, when the clamping pin 30 is loosely inserted, i.e. without any pulling force, into the central opening 2 of the clamping chuck 1. Depending on the design, the size and the dimensioning of the clamping apparatus, the above mentioned gap S can vary within wider limits, e.g. between 0.005 mm and 0.1 mm. It is understood that the lower surface of the work piece carrier 40 does not compellingly have to be flat, but that it can comprise different surfaces and/or planes. Important is only, the clamping apparatus still being in its released state, that a gap within the above mentioned limits exists between the coaxial surface portions 5, 6, serving as Z-stop members of the clamping chuck 1, and the surface areas of the work piece carrier 40 that are intended to rest on these surface portions 5, 6, such that the clamping pin 30 can align in X- and Y-directions without clearance to the inserting portion 3 of the central opening 2. Further, it is understood that the reference surface portion 37 of the clamping pin 30, constituting the Z-reference thereof, has not compellingly to coincide with the bottom surface 41 of the work piece carrier 40, but it can, if appropriate, be recessed or protrude therefrom, depending on the design of the clamping pin 30 and/or the work piece carrier 40 and its bottom surface, respectively.

Figure 4:
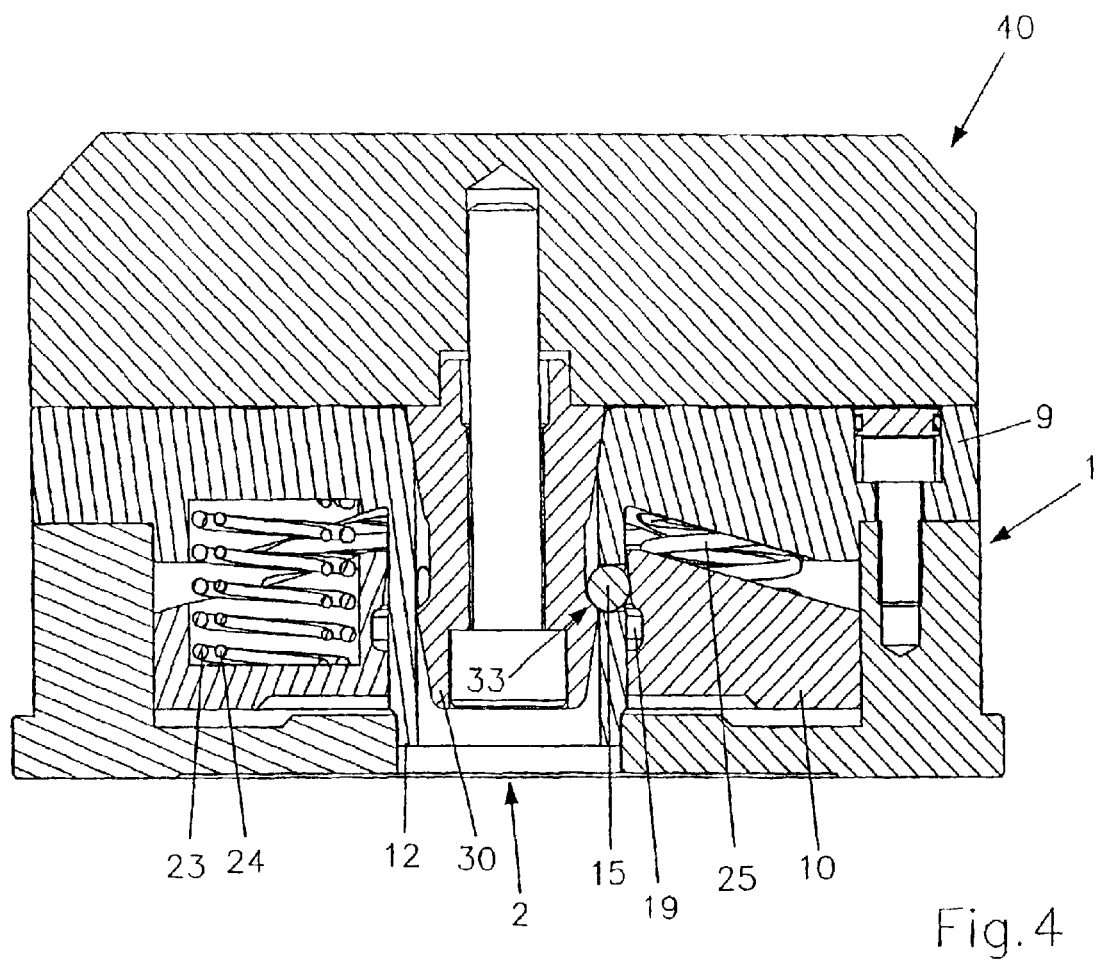
FIG. 4 shows a longitudinal sectional view of the clamping chuck with the work piece carrier clamped thereto.

FIG. 4 shows a longitudinal sectional view of the clamping chuck 1 with the work piece carrier 40 clamped onto it. In order to clamp the loosely inserted work piece carrier 40 to the clamping chuck 1, the pressure in the pressure chamber 17 is reduced, with the result that the piston 10 is pushed down into the position shown in FIG. 4 under the influence of coil springs 23, 25, as will be described in more detail herein after. Thereby, the clamping balls 15 are radially moved inwards, as is known in the art, where they rest on the shoulder 33 of the clamping pin 30, thereby pulling the latter one downwards. Under the influence of the high pulling force of up to 20 KN, both the clamping pin 30 is increased in length somewhat, with a simultaneous decrease of its diameter, and the conically shaped inserting portion 3 of the central opening 2 is somewhat widened. The result is that the clamping pin 30 is pulled into the central opening 2 somewhat deeper, with the work piece carrier 40 moving downwards in Z-direction until its flat bottom surface 41 rests on the surface portions 5, 6 of the clamping chuck 1, serving as Z-stops. Thus, the work piece carrier 40 is positioned not only in X- and Y-directions, but also in Z-direction. In other words: The alignment of the work piece carrier 40 with regard to the clamping chuck 1 in X- and Y-directions is accomplished without and clamping force acting on these two elements, while the movement of the work piece carrier 40 in Z-direction is accomplished exclusively by making use of the material elasticity of the clamping pin 30 and of the clamping chuck 1 in the region of its inserting portion 3 of the central opening 2.

The elements of the clamping apparatus essential for the operation thereof are adjusted to each other, as far as dimensions and shape is concerned, in such a way that the reduction of the width of the gap S between the flat bottom surface 41 of the work piece carrier 40 and the surface portions 5, 6 of the clamping chuck 1 to zero, after the fine positioning of the clamping pin 30 and, therewith, the work piece carrier 40 in X- and Y-directions, is realized essentially exclusively with the help of the material elasticity of the clamping pin 30 as well as of the clamping chuck 1 in the region of the central opening 2. Thus, and in contrast to clamping apparatuses of the prior art, no members or elements that are elastically resilient in Z-direction have to be provided.

From FIG. 4, showing a longitudinal sectional view of the clamping chuck 1 together with the work piece carrier 40 clamped thereto, particularly also the coil springs 23, 25 are evident, these springs being provided for biasing the piston 10 and responsible for the pulling force exerted on the clamping pin 30. For clarifying the design of the clamping chuck 1, the left side of the drawing shows a sectional view taken through the coil springs of the clamping chuck 1, while the right side shows a sectional view taken between adjacent coil springs of the clamping chuck 1.

Depending on the required pulling force, both the number of coil springs and their spring force can be selected. For realizing very high pulling forces, twin springs can be provided as can be seen in the left side of FIG. 4, where two coil springs 23, 24 are arranged coaxially one in the other one. For compensating of torque forces that may be exerted to the upper portion 9 of the clamping chuck 1, the winding sense of diametrically opposite coil springs 23, 25 is different. Preferably, the clamping chuck 1 is provided with a plurality of coil springs evenly distributed along a circular path; for example, to reach high pulling forces, practice has shown that a total of 16 coil springs should be used, i.e. 8 outer coil springs 23 and 8 inner coil springs 24.

Moreover, the right side illustration in FIG. 4 shows that the clamping mechanism can take high pulling forces due to the one piece design of the sleeve 12 and the upper portion 9 of the clamping chuck 1, and due to the clamping balls 15 being received in the sleeve 12 essentially without clearance.

In order to remove the work piece carrier 40 from the clamping chuck 1, the piston 10 is pneumatically or hydraulically moved upwards, against the force of the coil springs. Thereby, the clamping balls 15 are released with the result that they can move back into the groove 19, freeing the clamping pin 30 which now can be pulled upwards out of the central opening 2 of the clamping chuck 1. The clamping mechanism having been released, both the clamping pin 30 and the upper portion of the central opening 2 of the clamping chuck 1 revert to their original dimensions due to their elastic behavior.

Figure 5:
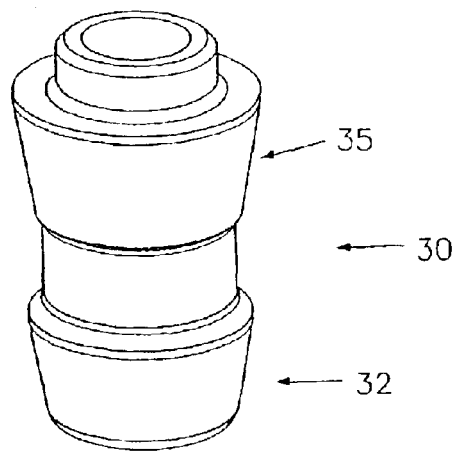
FIGS. 5 to 7 show perspective views of different embodiments of clamping pins.
Figure 6:
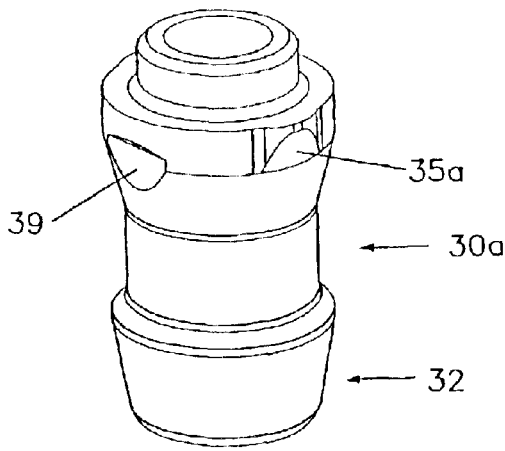
Figure 6A:
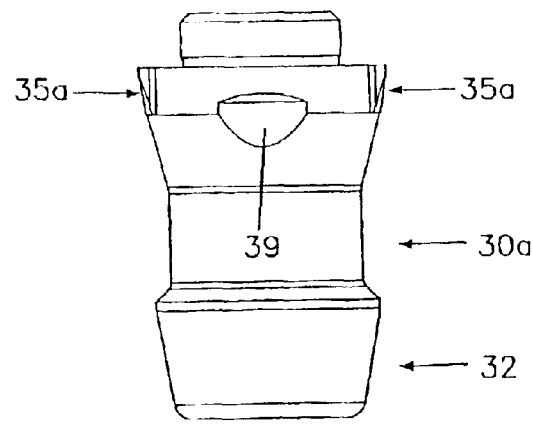
Figure 7:
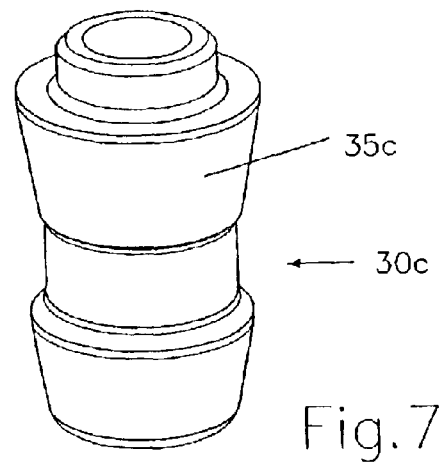

FIGS. 5 to 7 show three different embodiments of clamping pins 30, 30*a* and 30*c*, respectively, which are suitable to be used in combination with a large pallet comprising several clamping pins. The uppermost clamping pin 30 shown in FIG. 5 corresponds to the embodiment discussed already herein before; it comprises a surface portion 35 in the shape of a truncated cone for centering in X- and Y-directions and located at the rear end of the clamping pin 30. The clamping pin 30*a* shown in FIG. 6 comprises at its rear end, instead of a truncated cone shaped portion, two diametrically opposite surface portions 35*a* in the shape of a segment of a truncated cone. It is understood that only the frontal surface portion 35*a* can be seen in FIG. 6, while the rear one is hidden in this view. However, in FIG. 6*a* showing the clamping pin 30*a* in a side elevational view, both surface portions 35*a* are visible. By means of these surface portions 35*a*, the clamping pin 30*a* can be centered by means of the conical inserting portion 3 of the central opening 2 (FIG. 1) in one direction only, preferably in X-direction or in Y-direction. In order to enable the clamping pin 30*a* and its surface portions 35*a*, respectively, to be properly aligned upon attaching it to the work piece carrier 40, the clamping pin 30*a* is provided with two diametrically opposite flattened portions 39, adapted to be engaged by a wrench or similar tool. The lowermost clamping pin 30*c* according to FIG. 7 is provided at its rear end with a surface portion 35*c* having the shape of a truncated cone. However, that surface portion 35*c* has an outer diameter about 0.1 to 0.2 mm smaller than the outer diameter of the surface portion 35 of the clamping pin 30 according to FIG. 5. Thus, the clamping pin 30*c* acts as a simple clamping element without any centering and positioning function. The clamping apparatus being in its clamped state, i.e. if the flat bottom surface of the work piece carrier rests on the Z-reference surface portions of the clamping chuck, a gap in the region of 0.1 to 0.2 mm exists between the truncated cone shaped portion 35*c* of the clamping pin 30*c* according to FIG. 7 and the conical inserting portion 3 of the central opening 2 of the clamping chuck 1 (FIG. 1).

Instead of being provided with a truncated cone shaped portion 35, the clamping pin 30 according to FIG. 5 could be equipped with four surface portions 35*a* in the shape of a segment of a truncated cone, evenly distributed along the rear periphery of the clamping pin 30, for aligning it in X- and Y-directions.

Figure 8A:
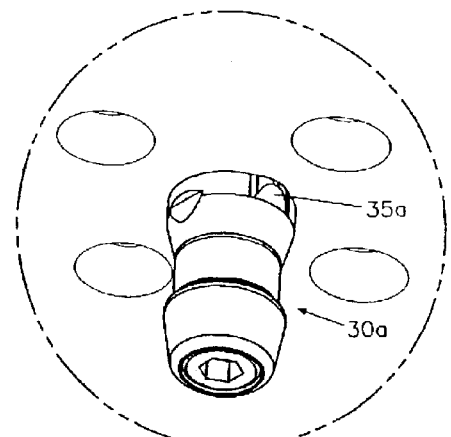
FIGS. 8a and 8b each show an enlarged view of clamping pins according to FIG. 8.
Figure 8B:
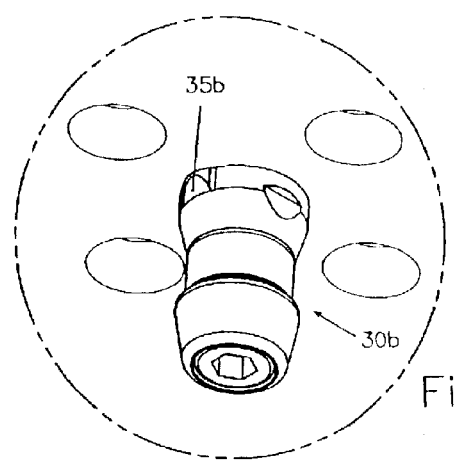
Figure 8:
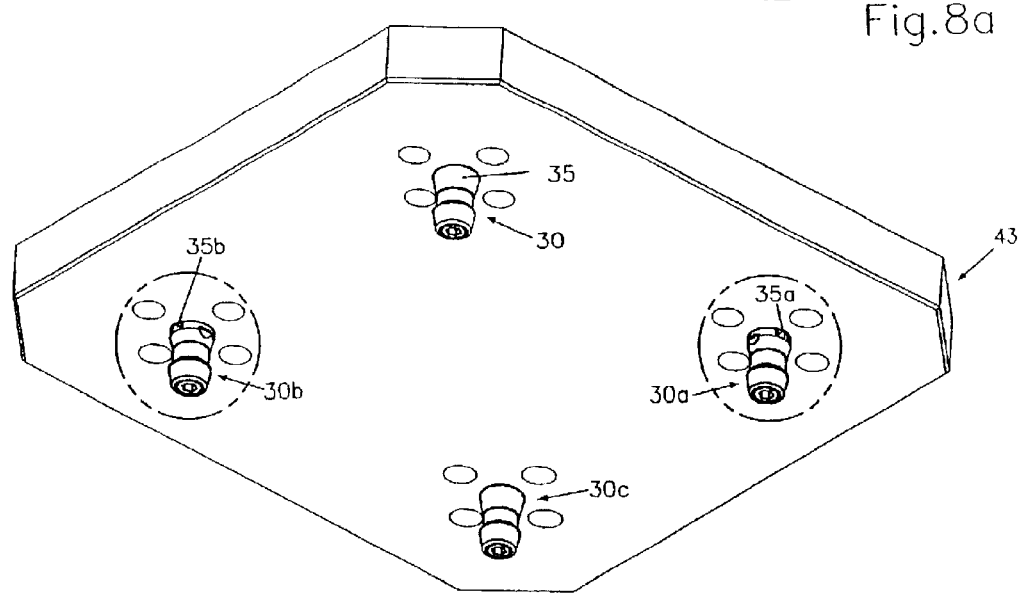
FIG. 8 shows a perspective view of a machining table and of a pallet.
Figure 8:
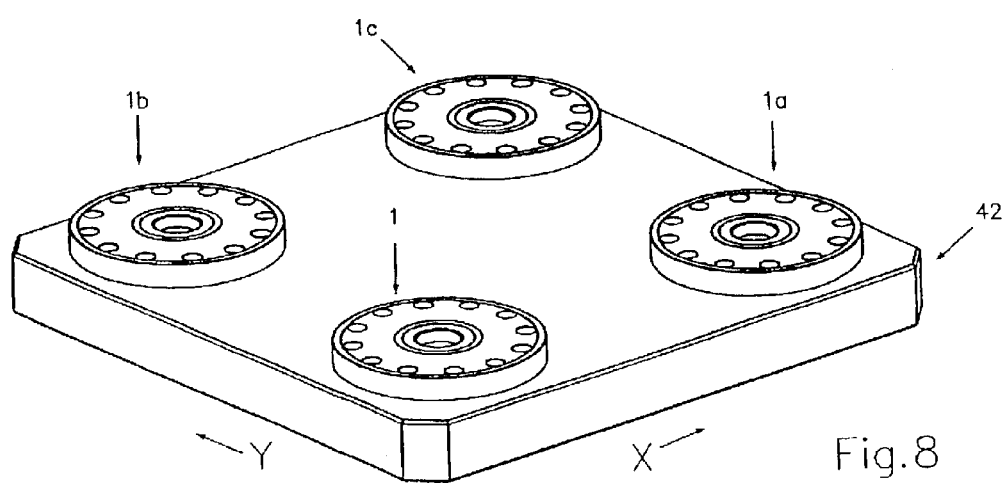

FIG. 8 shows a perspective view of a machining table 42 equipped with four clamping chucks 1, 1*a*, 1*b* and 1*c*, as well as of a work piece carrier 43, called a pallet in the following, equipped with four clamping pins 30, 30*a*, 30*b* and 30*c*. Out of the four clamping pins 30, 30*a*, 30*b* and 30*c*, the frontmost clamping pin 30 corresponds to the one shown in FIG. 5, provided with a truncated cone shaped portion 35 for centering the pin 30 in X- and Y-directions. This clamping pin 30 sets the origin once the pallet 43 having been clamped to the machining table 42. The two lateral clamping pins 30*a* and 30*b* are designed according to the embodiment shown in FIG. 6, each comprising two diametrically opposite surface portions 35*a* and 35*b*, respectively, in the shape of a segment of a truncated cone, whereby again only the frontal surface portions 35*a* and 35*b*, respectively, are visible. The rearmost clamping pin 30*c*, finally, corresponds to the embodiment according to FIG. 7 and acts only as a clamping member without any centering or positioning functions for clamping the pallet 43 to the machining table 42.

FIG. 8*a* shows an enlarged view of the right clamping pin 30*a*, and FIG. 8*b* shows an enlarged view of the left clamping pin 30*b*. These two clamping pins serve for determining the angular position of the pallet 43 around the origin defined by the clamping pin 30. Thereby, the surface portions 35*a* of the right clamping pin 30*a* align the pallet 43 in Y-direction, while the surface portions 35*b* of the left clamping pin 30*b* align the pallet 43 in X-direction. As mentioned before, the rearmost clamping pin 30*c* serves only for clamping the pallet 43 in Z-direction.

Even if two clamping pins 30*a*, 30*b* are provided in this embodiment for determining the angular position of the pallet 43 around the origin, it could be sufficient to provide only one clamping pin for this purpose. However, the design and arrangement of the clamping pins shown in FIG. 8 and discussed herein before has the advantage that no geometric over-determination of the position of the pallet upon clamping occurs, because thermal dimension changes of the pallet are compensated for by the corresponding clamping pins. Tests carried out on this subject have shown that the surface portions 35*a* of a clamping pin 30*a* designed according to the embodiment of FIG. 6 can equalize thermally caused expansions or dimensional deviations of the pallet 43 up to as much as 0.1 to 0.2 mm.

Besides the clamping chucks 1 discussed herein before which per se do not comprise any means for determining the angular position around the Z-axis of the work piece carrier, other clamping chucks could be provided which do comprise means for determining not only the position in X- and Y-directions, but also the angular position around the Z-axis, with the result that, if appropriate, a work piece carrier having only one clamping pin can be clamped to the clamping chuck both in a desired linear and angular positions. It is understood that, in such a case, the work piece carrier would be provided with suitable positioning means, whereby the clamping pin serves only for a coarse positioning of the work piece carrier, but not for a fine positioning. Then, the clamping pin would have the design as shown in FIG. 7 and discussed in connection therewith.

What is claimed is:

1. A clamping apparatus, comprising:

a clamping chuck;

a work piece carrier adapted to be releasably connected to said clamping chuck;

said work piece carrier having a flat bottom surface and comprising a clamping pin protruding from said flat bottom surface;

said clamping chuck comprising a central opening for receiving said clamping pin of said work piece carrier, said central opening having a conical inserting portion;

said clamping pin comprising at least one surface portion corresponding in shape to the shape of said conical inserting portion of said central opening for aligning the position of said clamping pin in any direction selected from the following group: X-direction, Y-direction, and X- and Y-directions;

said clamping chuck further comprising a clamping mechanism for clampingly fixing said clamping pin of said work piece carrier in said central opening, and at least one surface portion serving as a Z-direction stop member; and said clamping pin and said clamping chuck being dimensioned such that, prior to activating said clamping mechanism, a gap exists between said flat bottom surface of said work piece carrier and said surface portion of said clamping chuck serving as a Z-direction stop member after said clamping pin of said work piece carrier has been inserted into said central opening of said clamping chuck so that said at least one surface portion of said clamping pin has engaged said conical inserting portion of said central opening and thereby has aligned said clamping pin with reference to said clamping chuck in any direction selected from the following group: X-direction, Y-direction, and X- and Y-directions, whereby and wherein said clamping pin or a portion of said clamping chuck that defines said central opening of said clamping chuck is adapted to be elastically deformed upon activation of said clamping mechanism to further pull in said clamping pin into said central opening and simultaneously said work piece carrier towards said surface portion of said clamping chuck serving as a Z-direction stop member until said flat bottom surface of said work piece carrier rests on said surface portion of said clamping chuck serving as a Z-direction stop member.

2. Clamping apparatus according to claim 1 in which said gap between said flat bottom surface of said work piece carrier and said surface portion of said clamping chuck serving as a Z-direction stop member has a width of between 0.005 mm and 0.1 mm.

3. Clamping apparatus according to claim 1 in which said clamping pin comprises a surface portion constituting a Z-reference which protrudes above said surface portion of said clamping chuck serving as a Z-direction stop member by an amount of 0.005 mm to 0.1 mm after alignment of said clamping pin in X- or Y-direction.

4. Clamping apparatus according to claim 1 in which said clamping pin comprises a front surface portion serving as a coarse centering portion and a rear surface portion serving as a fine centering portion.

5. Clamping apparatus according to claim 4 in which said front surface portion of said clamping pin has the shape of a truncated cone.

6. Clamping apparatus according to claim 4 in which said rear surface portion of said clamping pin has the shape of a truncated cone surface adapted to align the position of the clamping pin in X- and Y-directions in cooperation with said conical inserting portion of said central opening of said clamping chuck.

7. Clamping apparatus according to claim 4 in which the maximal diameter of said front surface portion of said clamping pin is greater than the minimal diameter of said rear surface portion of said clamping pin.

8. Clamping apparatus according to claim 4 in which the rear portion of said clamping pin comprises two diametrically opposite surface portions adapted to align said clamping pin in X- or Y-direction.

9. Clamping apparatus according to claim 4 in which the rear portion of said clamping pin comprises four surface portions evenly distributed along the periphery of said clamping pin and adapted to align said clamping pin in X- and Y-direction.

10. Clamping apparatus according to claim 8 in which said rear surface portions have the shape of a segment of a truncated cone.

11. Clamping apparatus according to claim 1 in which said central opening of said clamping chuck is designed as a continuous smooth bore.

12. Clamping apparatus according to claim 5 in which the minimal outer diameter of said front, truncated cone shaped surface portion of said clamping pin is between 3 to 15 mm smaller than the maximal diameter of said conical inserting portion of said central bore of said clamping chuck.

13. Clamping apparatus according to claim 5 in which the amount of taper of said front surface portion of said clamping pin corresponds to the amount of taper of said conical inserting portion of said central bore of said clamping chuck.

14. Clamping apparatus according to claim 1 in which said clamping pin comprises a circumferential shoulder, and in which said clamping mechanism comprises a plurality of clamping balls as well as an actuating piston which is movable, for radially moving the clamping balls, from a release position into a clamping position in which said clamping balls engage said circumferential shoulder of said clamping pin.

15. Clamping apparatus according to claim 14 in which said actuating piston is axially movably received between an upper portion of said clamping chuck and a lower portion of said clamping chuck, whereby said actuating piston is biased by means of springs resting on said upper portion of said clamping chuck towards said lower portion of said clamping chuck.

16. Clamping apparatus according to claim 14 in which:
said actuating piston is movable, against the biasing force of said springs, from a clamping position to a release position, and
said actuating piston is configured to be moved by a fluid system selected from the following group: a pneumatic system and a hydraulic system.

17. Clamping apparatus according to claim 15 in which said upper portion of said clamping chuck comprises a hollow cylindrical sleeve member whose interior constitutes said central opening in said clamping chuck adapted to receive said clamping pin and which is provided with radially extending bores adapted to receive said clamping balls.

18. Clamping apparatus according to claim 17 in which said hollow cylindrical sleeve member extends up to said lower portion of said clamping chuck.

19. Clamping apparatus according to claim 15 in which at least two diametrically opposite helical springs are provided for biasing said actuating poiston, whereby the winding sense of opposite helical spring is different.

20. Clamping apparatus according to claim 19 in which in each case two helical coils are coaxially arranged.

21. Clamping apparatus according to claim 15 in which the bottom of the upper portion of the clamping chuck facing said actuating piston extends from the center radially downwards.

22. A clamping apparatus, comprising:
at least two clamping chucks;
a work piece carrier adapted to be releasably connected to said clamping chucks;
said work piece carrier having a flat bottom surface and comprising a plurality of clamping pins protruding from said flat bottom surface;
said clamping chucks each comprising a central opening for receiving one of said clamping pins of said work piece carrier, said central opening having a conical inserting portion;
one of said clamping pins comprising a surface portion corresponding in shape to the shape of said conical inserting portion of said central opening for aligning the position of said clamping pin in X- and in Y-direction;

at least another one of said clamping pins comprising a surface portion having a shape for aligning the position of said clamping pin only in one direction selected from the following group: X-direction and Y-direction;

each of said clamping chucks further comprising a clamping mechanism for clampingly fixing one of said clamping pins of said work piece carrier in said central opening, and at least one surface portion serving as a Z-direction stop member; and each of said clamping pins and said clamping chucks being dimensioned such that, prior to activating said clamping mechanism, a gap exists between said flat bottom surface of said work piece carrier and said surface portion of said clamping chuck serving as a Z-direction stop member after a clamping pin of the work piece carrier has been inserted into the central opening of the corresponding clamping chuck so that said surface portion of a clamping pin has engaged said conical inserting portion of said central opening and thereby has aligned the clamping pin with reference to the corresponding clamping chuck in X- or Y-direction, whereby the clamping pin or a portion of the claming chuck that defines the central opening of the clamping chuck is adapted to be elastically deformed upon activation of said clamping mechanisms to further pull in the clamping pins into the central opening and simultaneously said work piece carrier towards said surface portions of said clamping chucks serving as a Z-direction stop member until said fiat bottom surface of said work piece carrier rests on said surface portions of said clamping chucks serving as a Z-direction stop members.

23. Clamping apparatus according to claim 22 in which said at least another one of said clamping pins is adapted to align the work piece carrier only in one direction selected from the following group: X-direction and Y-direction, wherein a rear portion of said at least another one of said clamping pins is provided with two diametrically opposite surface portions.

24. Clamping apparatus according to claim 9 in which said rear surface portions have the shape of a segment of a truncated cone.

25. Clamping apparatus according to claim 16 in which said upper portion of said clamping chuck comprises a hollow cylindrical sleeve member whose interior constitutes said central opening in said clamping chuck adapted to receive said clamping pin and which is provided with radially extending bores adapted to receive said clamping balls.

26. A clamping apparatus, comprising:
a work piece carrier including (i) a clamping pin having a first conical reference surface, and (ii) a base including a bottom surface that defines a second reference surface; and
a clamping chuck including (i) a top surface that defines a third reference surface, and (ii) a fourth conical reference surface that defines an opening configured to receive said clamping pin of said work piece carrier, said first conical reference surface being configured to mate with said fourth conical reference surface,
wherein said clamping chuck includes a clamping mechanism having (i) a first mode of operation in which said clamping mechanism allows release of said clamping pin from said opening of said clamping chuck, (ii) a second mode of operation in which said clamping mechanism clamps said clamping pin within said opening of said clamping chuck, and
wherein a gap exists between said second reference surface of said base of said work piece carrier and said third reference surface of said clamping chuck when both (i) said first conical reference surface of said clamping pin is supported on said fourth conical reference surface of said clamping chuck, and
(ii) said clamping mechanism is in said first mode of operation.

27. The clamping apparatus of claim 26, wherein said second reference surface of said base of said work piece carrier contacts said third reference surface of said clamping chuck when both (i) said first conical reference surface of said clamping pin is supported on said fourth conical reference surface of said clamping chuck, and (ii) said clamping mechanism is in said second mode of operation.

28. The clamping apparatus of claim 26, wherein:
said second reference surface is flat, and
said third reference surface is flat.

29. The clamping apparatus of claim 26, wherein:
said first conical reference surface is a first X- and Y-direction reference surface, and
said second reference surface is a first Z-direction reference surface,
said third reference surface is a second Z-direction reference surface, and
said fourth conical reference surface is a second X- and Y-direction reference surface.

30. A clamping apparatus, comprising:
a work piece carrier including (i) a clamping pin having a first reference surface, and (ii) a base that defines a second reference surface; and
a clamping chuck including (i) a third reference surface, and (ii) a fourth reference surface that defines an opening configured to receive said clamping pin of said work piece carrier,
wherein said clamping chuck includes a clamping mechanism having (i) a first mode of operation in which said clamping mechanism allows release of said clamping pin from said opening of said clamping chuck, (ii) a second mode of operation in which said clamping mechanism clamps said clamping pin within said opening of said clamping chuck, and
wherein a gap exists between said second reference surface of said base of said work piece carrier and said third reference surface of said clamping chuck when both (i) said first reference surface of said clamping pin is supported on said fourth reference surface of said clamping chuck, and (ii) said clamping mechanism is in said first mode of operation.

31. The clamping apparatus of claim 30, wherein said second reference surface of said base of said work piece carrier contacts said third reference surface of said clamping chuck when both (i) said first reference surface of said clamping pin is supported on said fourth reference surface of said clamping chuck, and (ii) said clamping mechanism is in said second mode of operation.

32. The clamping apparatus of claim 26, wherein:
said second reference surface is flat, and
said third reference surface is flat.

33. The clamping apparatus of claim 26, wherein:
said first reference surface is conically shaped, and
said fourth reference surface is conically shaped.

34. The clamping apparatus of claim 30, wherein:
said first reference surface is a first X- and Y-direction reference surface, and said second reference surface is a first Z-direction reference surface,
said third reference surface is a second Z-direction reference surface, and
said fourth reference surface is a second X- and Y-direction reference surface.

35. The clamping apparatus of claim 30, wherein said first reference surface is configured to mate with said fourth reference surface.

36. The clamping apparatus of claim 30, wherein:
said base of said work piece carrier includes a bottom surface that defines said second reference surface, and
said clamping chuck includes a top surface that defines said third reference surface.

* * * * *